United States Patent [19]

Veronneau et al.

[11] 4,364,773
[45] Dec. 21, 1982

[54] WASTE METAL CONVERSION PROCESS AND PRODUCTS

[76] Inventors: Marcel Veronneau, 48 North St., Watertown, Conn. 06795; Thomas Marino, Hydlar Ave., Prospect, Conn. 06712

[21] Appl. No.: 220,002

[22] Filed: Dec. 23, 1980

[51] Int. Cl.³ .............................................. C08L 95/00
[52] U.S. Cl. ................................. 106/281 R; 423/34; 423/37; 423/43
[58] Field of Search ............... 106/281 R; 423/34, 37, 423/43

[56] References Cited

U.S. PATENT DOCUMENTS

| 1,372,467 | 3/1921 | Willis | 106/281 |
|---|---|---|---|
| 1,793,906 | 2/1931 | Christensen | 423/140 |
| 2,332,260 | 10/1943 | Roediger | 106/281 |
| 2,662,009 | 12/1953 | Roberts et al. | 75/108 |
| 2,915,388 | 12/1959 | Lyle et al. | 75/108 |
| 3,470,006 | 9/1969 | Brunel | 106/281 |
| 3,832,453 | 8/1974 | Slovonsky et al. | 423/561 |
| 3,917,519 | 11/1975 | Fisher et al. | 204/108 |
| 3,953,306 | 4/1976 | Lancy | 204/106 |
| 4,073,860 | 2/1978 | Huggins et al. | 423/140 |
| 4,157,942 | 6/1979 | Tuznik et al. | 204/35 R |

Primary Examiner—John Kight, III
Assistant Examiner—Amelia B. Yarbrough

[57] ABSTRACT

A process is provided by which dissolved metals may be recovered from aqueous waste solutions and converted to a particulate material, which may in turn be used as a filler for products such as asphalt. The process involves effecting reaction in the solution to produce a sludge comprised of metal hydroxides and sulfides, and admixing lime with a concentrate thereof to ultimately produce the filler.

41 Claims, No Drawings

WASTE METAL CONVERSION PROCESS AND PRODUCTS

BACKGROUND OF THE INVENTION

The acceptable disposal of harmful and offensive industrial waste materials has, of course, long been a matter of serious concern, which concern has, with time, become critical. This is due to a number of factors, fundamental amongst which is the compound effect of ever-rising demands made upon steadily diminishing disposal facilities. While, therefore, new and better methods are constantly being sought for either eliminating the waste, or for converting it to a usable (or at least innocuous) form, the development of technologically feasible and economically attractive alternatives is not only difficult in the first instance, but is also severely constrained by the need to satisfy stringent prevailing environmental standards.

Because toxic and otherwise obnoxious solutions of metals are involved, the electroplating industry has long been faced with difficult waste disposal problems. Despite widely used techniques for recovering metal values from exhausted plating baths, dilute rinsewater streams, and the like, and for destroying objectionable chemical species (e.g., phenols, cyanide, phosphates, and the like), the need for safe, effective, convenient, practical, environmentally acceptable and economically attractive disposal schemes remains acute.

Accordingly, it is a primary object of the present invention to provide a novel method for disposing of waste metals in a manner that is safe, effective, convenient, practical and attractive, from both economic and also environmental standpoints.

It is a related object of the invention to provide such a method which is relatively uncomplicated, safe and convenient to carry out.

Another object of the invention is to provide a novel method of the foregoing sort, which may be utilized to convert waste metals into products in which the metal is not only safely and permanently isolated, but which also have value on the marketplace sufficient to at least offset the cost that would be involved in disposal by other means, and which may in some instances provide a positive economic return.

Yet another object of the invention is to provide novel filler materials, and unique products incorporating the same, utilizing resources that would otherwise constitute an undesirable waste product for which means of disposal are both scarce and also expensive.

SUMMARY OF THE INVENTION

It has now been found that certain of the foregoing and related objects of the invention are readily attained in a process for producing a finely divided filler material from an aqueous solution containing at least one metal capable of reaction to form insoluble hydroxide and sulfide compounds. In accordance with the process, reaction is effected in the solution to produce an aqueous sludge comprised of an insoluble hydroxide precipitate of the metal. Water is removed from the sludge to produce a concentrate containing less than about 60 weight percent thereof, and about 10 to 40 percent, based upon the weight of the concentrate, of a basic fixative is admixed therewith, the fixative being a compound or a mixture that is capable of exothermic hydration and combination with the precipitate. Drying is effected at one or more stages of the process to ultimately produce a homogeneous, particulate filler material containing less than about 25 weight percent of water.

In preferred embodiments of the process, the pH of the solution will be established at a value of about 7.5 to 9.5 to produce the precipitate, and normally sodium hydroxide will be used for that purpose. Typical of the metals for which such a procedure may be used are those selected from the class consisting of copper, iron, nickel, chromium and mixtures inclusive of at least one of them, although other metals (e.g. cadmium, zinc, lead, etc.) may be involved in addition thereto or in lieu thereof. When hexavalent chrome is introduced into the solution, a reducing agent, such as sodium bisulfite, may be added to convert the chrome to the trivalent state. Most desirably, sulfide ion (e.g., as sodium sulfide) will be added to the solution to produce the insoluble salt of the metal, with the introduction generally being made subsequent to the production of the metal hydroxide precipitate. In some instances, it may be desirable to lower the pH of the solution at this point, to promote precipitate formation, and generally a value of less than about 5 will be most effective. Chloride ion (e.g., as calcium chloride) may also be introduced (primarily to promote iron precipitation), but usually this will be done only in instances in which a soluble sulfide has previously been added. Calcium oxide will generally provide the most effective and practical fixative, and usually about 25 percent of fixative, based upon the weight of the concentrate, will be used.

The water-removal step of the process will normally entail clarification, such as by settling of the precipitate, decanting of water therefrom, and filtration of the solid fraction (preferably under vacuum) to produce the concentrate; most desirably, a flocculating agent will be added to the sludge to promote coagulation and settling of suspended solid particles. In most instances, the drying step will include a substantial period of dormancy preceding the fixative admixing step, which should generally last for about 72 hours and occur in the open. During hydration, ultimate autogenic temperatures will be attained in the admixture, producing free-water reduction by evaporation as well as through hydration of the fixative; ultimate temperatures of at least about 60°, and preferably in excess of about 100°, Centigrade will usually be reached. To be suitable for certain applications, the filler material should contain less than about three percent of water; hence, the final phases of the drying step will usually be effected by introducing thermal energy from an external source into the lime/sludge concentrate admixture (alone or with other materials), thereby heating it to a temperature of about 120° to 200° Centigrade; frequently, the moisture content will be reduced to below about 1.0 percent as a result.

As a practical matter, a plurality of streams will usually be combined to produce the metal-containing liquor, and the aqueous phase of the sludge produced therefrom will generally be analyzed for metal content, to determine the nature and quantity of any additives to be introduced. Frequently, the process will be employed with a stream containing a substantial concentration of trivalent chrome, obtained by pretreating a raw solution of hexavalent chrome to effect reduction to the trivalent state. To be most effective, a pH value of about 2 to 5 will generally be maintained in the hexavalent chrome solution during the pretreating step, and sodium bisulfite may be used as the reducing agent. At least one of the combined streams may contain a substantial concentration of converted toxic organic compounds, in which case the process will additionally include a pretreatment step to effect their conversion to non-toxic derivatives; this may comprise subjecting the toxic compounds to oxidizing conditions. Similarly, the process may include a pretreatment step to effect the conversion of harmful anions to relatively innocuous derivatives. In many instances, at least one of the streams will be derived from a mixture comprising aqueous and organic phases, in which cases pretreatment will be effected to remove the organic phase. The process may, as a further practical matter, also include steps of filtering and aerating the water removed from the sludge, to produce a wastewater stream of a purity level satisfactory to permit its direct discharge to sewerage from the system.

Certain objects of the invention are attained in a method for producing an asphalt paving mix, in which the filler material, made in accordance with the above-described process, is combined with asphalt aggregate material to provide an aggregate mixture containing about 5 to 25 weight percent of the former. The filler material may be combined with the aggregate material before complete drying (i.e., as the "fixed admixture"), in which case it will be further dried along with the other components of a total aggregate mixture; alternatively, however, it will be predried to less than three, and preferably less than one, percent water. The bituminous binder or cement will, of course, ultimately be admixed with the aggregate mixture to provide the paving mix product. Additional objects are attained by the provision of the filler material, and the asphalt mix, per se.

DETAILED DESCRIPTION OF THE PREFERRED EMBODIMENTS

As a practical matter, the process of the present invention will generally be carried out utilizing a solution containing a variety of dissolved metals in concentrations which may vary greatly. The solution in which reaction is effected to produce the hydroxide and sulfide precipitates will generally be derived from numerous diverse sources, and each of the composite streams may have a character which is entirely distinct from the others. Regardless of this, an attempt will generally be made not only to pretreat the various streams to remove toxic and harmful components by subjecting them to conventional methods, but also to combine them in such volumes that the components may react with one another in a beneficial way. For example, a stream containing hexavalent chrome may be mixed in a suitable proportion with a stream containing divalent iron, to convert both to the trivalent oxidation state through a typical redox reaction. The component streams may be subjected to other conventional treatments, such as for the purpose of destroying harmful anions typically present in electroplating solutions (e.g., cyanide, phosphate, etc.), to oxidize toxic organic materials, such as the phenols, and to remove organic phases, such as may include oils, tars, and the like, and the latter may be accomplished by simple surface skimming operations. While it is not essential to conduct a rigorous quantitative or qualitative analysis of the streams comprising the mixed liquor, it will generally be the practice to perform an analysis of their compositions, so as to ensure compatability in the solution and ideally to enable proportions and ingredients to be selected to achieve the most desirable mix.

Once an appropriate volume of the mixed liquor has been collected, the process will proceed by effecting appropriate pH adjustment and by the addition of such amounts of caustic soda or other base as may be necessary to produce the hydroxide precipitate in the liquor. As has been pointed out hereinabove, the pH value for the reaction will normally lie in the range of 7.5 to 9.5, although higher and slightly lower values may be appropriate under certain circumstances. Moreover, as will be evident to those skilled in the art, the specific value of pH to be established will depend to an extent upon the metal ion species that are present in the solution. For example, since a low pH will favor the production of the nickel hydroxides, a value at the lower end of the range will be employed when the concentration of nickel is high. On the other hand, if the amount of copper present in the liquor is relatively high, the pH might be adjusted to a value in the range 8 to 8.5, since doing so will favor reaction to produce the copper hydroxides. Other factors may also influence the adjustment of pH in the solution, such as the desire to establish conditions favorable to subsequent operations, such as flocculation. Specifically, if it is desired to maximize the efficiency of that mechanism (and depending upon the chemical nature of any flocculating agent utilized), a pH value near the upper end of the range may be maintained. As mentioned, from the standpoint of practicality and economics, the reagent utilized to raise the pH value will generally be sodium hydroxide; however, other compounds may of course be utilized to increase the alkalinity of the liquor, as will be evident to those skilled in the art. Similarly, a variety of acidic reagents may be employed for pH lowering, but again from the standpoint of practicality and economics sulfuric acid will normally be employed. In some instances the liquor may include substances that inhibit hydroxide precipitate formation, in which cases it may be desirable to initially lower the pH to the acid side, thus apparently freeing the metal ions and enabling conversion to the hydroxides upon appropriate pH adjustment.

At the end of the time allotted for completion of the reaction above described, the supernatant liquid will generally be analyzed to determine the concentration of dissolved metals present therein, and usually this will be utilized as the criterion for determining whether or not further reaction should be effected; municipal environmental standards for water purity will be employed in most instances. For example, prevailing standards for discharge to sewerage may specify allowable levels of nickel and copper at one part per million, and the allowable level of iron at three parts per million. If the supernatant liquid contains higher concentrations, further steps must be taken to precipitate the dissolved metal ions.

To do so, a source of sulfide ion will usually be introduced into the mixture, and typically this will be done by adding sodium sulfide, although other reagents may be employed instead. The alternatives will be evident to those skilled in the art and, assuming that conditions permit it, the conventional practice of bubbling hydrogen sulfide gas through the solution may be followed to produce sulfides of the dissolved metals. While a soluble sulfide compound will usually be introduced following addition of the hydroxide, this will not necessarily be the case, and the sulfide ion may have been introduced previously, or formed in situ. Further reactions (e.g., iron precipitation) may, under certain circumstances, be favored by the presence of chloride ion, and a source thereof (typically calcium chloride) may be introduced for that purpose. Obviously, the amounts of sulfide and chloride compounds utilized will depend upon the concentrations of the various metals present in the liquor, and must be determined on a case-by-case basis. While it is true that an objective in carrying out the foregoing precipitation reactions is to produce a clean wastewater stream, certain advantages of the process (in terms of metal utilization) will be realized regardless of whether or not a satisfactorily purified wastewater stream is obtained.

If the mixed liquor contains a significant (but not excessively high) amount of hexavalent chrome, a reducing agent will generally be added to convert the chrome to the trivalent state, and generally this will be done prior to establishment of optimal conditions for the precipitate reaction. Sodium bisulfite is conveniently and effectively utilized for this purpose; however, other reducing agents may, of course, be substituted and may, indeed, be more desirable depending upon the pH of the reaction mixture. Again, the amount of reducing agent introduced will depend upon the concentration of hexavalent chrome present in the solution, and may either be determined initially or may be adjusted on the basis of an analysis carried out after some of the reagent has been added.

On the other hand, when the concentration of hexavalent chrome in one of the component streams is relatively high, i.e., on the order of magnitude of 100 parts per million or greater, it will generally be preferable to treat the component stream, rather than the mixed liquor, so as to avoid utilizing excessive amounts of the reducing agent through the unnecessary reduction of other species present in the liquor. When only the component stream is so treated, its pH level will generally be reduced to a value of about 2 to 5, since the reaction with sodium bisulfite is favored under acidic conditions. This adjustment would not, of course, generally be practical in the mixed solution, in view of the much greater volumes of liquid involved, and is a further reason while high concentrations of hexavalent chrome will normally be dealt with prior to admixture with other components of the liquor. It should be borne in mind, however, that the liquor may itself contain species which are capable of reducing the hexavalent chrome to the trivalent state, thus frequently making unnecessary any measure for specifically dealing with the chrome constituent.

Following completion of the precipitation reactions, the liquor mix will usually be pumped to a clarifier, where a suitable flocculating agent may be added to coagulate colloidal or otherwise dispersed particles, so as to promote settling. The nature of the flocculating agent will, of course, depend upon the pH and possibly other characteristics of the solution, and the choice will be apparent to those skilled in the art. It will usually be chosen simply to produce the maximum amount of coagulation and settling in the minimum amount of time; however, stability of the floc may also be a consideration.

Subsequent to clarification, the treated liquor will normally be pumped to a decanting tank (taking care not to break the floc excessively), in which the supernatant liquid will be separated from the solid precipitate fraction; the equipment used may be a weir tank of conventional design. In any event, the water flowing from the tank will desirably be sufficiently free of metal contaminants to permit it to be discharged directly to a municipal sewer system, although filtration and/or aeration to remove solids and to oxidize impurities, respectively, may desirably be carried out before discharge.

The solid concentrate, or mud, recovered from the decanting tank will be subjected to a filtration operation, so as to minimize the amount of water present, and this will usually be done most practically by vacuum filtration. As removed from the filter, the concentrate should have a maximum water content of about 60 weight percent, and preferably the amount will be 50 percent or less; utilizing conventional techniques, a reasonable lower limit upon the amount of water appears to be on the order of magnitude of 40 weight percent.

From the filter, the mud will generally be removed to a location at which it can lie dormant for a substantial period of time, generally about 72 hours or more, to permit further drying, and to provide an opportunity for oxidation and equilibria attainment. While such conditions may be produced through active treatment of the mud, the most practical, economic and convenient approach may simply be that of depositing the concentrate as a pile in an open storeyard, where atmospheric exposure can readily occur; however, in some instances space requirements, anticipated weather conditions and time constraints may favor more active measures.

Subsequent to the foregoing, the mud is mixed with a fixative material capable of exothermic hydration and combination with the sludge, to produce a friable mass. Mixing may be accomplished in any convenient manner, and when the mud is in the form of a pile, heavy duty earth-handling equipment (e.g., a backhoe) may be employed for that purpose. Alternatively, standard industrial mixers and blenders may be used if the circumstances warrant doing so, and obviously, it will be desirable to achieve thorough mixing and homogeneity.

The most practical fixative material, considering cost and effectiveness, will usually be one comprised of at least 50 percent by weight of lime (calcium oxide), and it may desirably be constituted essentially entirely of that material. When exposed to water, lime of course hydrates to calcium hydroxide and, in doing so, generates a considerable amount of thermal energy. As a result, water remaining in the sludge is not only taken up in the hydration reaction, but is also driven off through evaporation (as are, incidentally, any low-boiling organics present). Generally, the heat buildup will result in temperatures of at least 60° Centigrade, and frequently they will be upward of 100° Centigrade. As will be obvious, a suitable period of time will be permitted to allow the hydration action to occur, and to achieve maximum evaporation of free water.

Following hydration, the fixed sludge product will normally contain less than about 25 weight percent of water, which will generally represent a practical upper limit of moisture for desirable products. Preferably, it will be further dried to reduce the amount of water to less than three, and most desirably less than one, percent.

Regardless of the particular fixative used, it will, in addition to reducing the free water content, tend to neutralize any acidic components that may be present, and combine (chemically, physically or both) with the solids of the sludge. A fixed, stable material is thereby produced in which the metals precipitated from the liquor mix are isolated and are virtually non-leachable, particularly under naturally occurring environmental conditions. As as a result, fillers and filled products produced from the fixed sludge can safely and conveniently be utilized in a variety of applications, as will be more fully discussed hereinbelow.

In terms of proportions, the amount of fixative employed may vary somewhat, and may depend upon the characteristics of the particular sludge being treated. Generally, however, at least ten weight percent of the fixative will be necessary to produce the desired product; on the other hand, the practical upper limit will generally be dictated by economics, and usually no more than about 40 percent, based upon the weight of the concentrate, will be used. The preferred ratio of mud to lime is about 4:1.

Illustrative of the efficacy of the present invention is the following specific example, wherein all parts and percentages specified are on a weight basis.

EXAMPLE ONE

PART A

A quantity of sludge is produced from a mixed liquor derived from diverse sources, and containing varying amounts of dissolved metals; i.e., chrome, copper, iron, nickel, cadmium, zinc, lead and silver. The liquor is neutralized with caustic soda to a pH of about 8, thus producing a heavy precipitate, following which sodium sulfide is introduced to maximize the amounts of metals precipitated. A commercial flocculating agent is then added to clarify the supernatant liquid, water is decanted, and the mass is vacuum filtered to about 50 percent solids. The resultant product is exposed in the open for a period of several days during which dry conditions prevail, following which it is apportioned for further treatment and testing.

Part of the mass of mud so produced is further dried at about 115° Centigrade, to less than about three percent moisture content. Another part is blended with quicklime, in a 4:1 ratio of mud to lime, with the reaction therebetween being permitted to proceed to substantial completion. A portion of the thus fixed sludge is kiln dried at a temperature of about 170° Centigrade, again for a period of time sufficient to reduce its free-water content to less than about two percent. Two samples of each of the three products, i.e., untreated dried sludge (US), fixed sludge (FS), and fixed kiln-dried sludge (DS), are then digested separately for 48 hours with constant agitation, using a dilute solution of sulfuric acid in distilled, deionized water; the initial pH of the solution is about 4, and ten parts per hundred of the sample is used for the digestion.

The solutions are then analyzed to determine the quantities of the several metals leached from each of the samples, as well as their contents of total organic carbon (TOC). These data, in parts per million, are set forth in Table One which follows, together with the values of pH ultimately developed in each solution. In the Table, hexavalent chrome, rather than total chrome (which is typically 0.03 to 0.07 parts per million), is reported, and values indicated as "0.01" are generally lower (and invariably so in the case of hexavalent chrome), that figure representing the limits of sensitivity of measurement techniques employed.

PART B

A quantity of the kiln dried fixed sludge product of the foregoing Part is mixed with aggregate materials, and thereafter blended with a hot bituminous binder, to produce an asphalt paving mix. Specifically, to produce one ton of the mix, 300 pounds of the dried sludge product is mixed with 900 pounds of sand, 222 pounds of quarter-inch stone, 458 pounds of three-eighths inch stone and 120 pounds of asphalt cement. The product is used for paving of a road surface, and found to function in a manner entirely comparable to a commercial asphalt into which no sludge product is incorporated.

Two specimens of the sludge-containing asphalt mix (SA) are subjected to leach tests, which are run in parallel with samples of the commercial product (CA) from which the sludge product is omitted. In one test, the sample is agitated constantly for a period of 48 hours with an aqueous (distilled, deionized water) solution of sulfuric acid having a pH of 4; in the other, distilled, deionized water alone is used, again under agitation for 48 hours. In all instances, ten parts of sample per hundred parts of aqueous phase are employed, and the tests are run under ambient conditions.

Analyses are performed to determine the concentrations of dissolved metals and organics resulting from each digestion, and are also reported in Table One. The numbers following the sample designations "SA" and "CA" indicate the starting pH of the digestion mixtures.

TABLE ONE

| Sample | Cr | Cu | Fe | Ni | Cd | Zn | Pb | Ag | TOC | pH |
|---|---|---|---|---|---|---|---|---|---|---|
| US(1) | 0.01 | 6.88 | 0.05 | 3.14 | 0.36 | 0.19 | 0.36 | 0.21 | 298 | 6 |
| US(2) | 0.02 | 7.08 | 0.07 | 2.97 | 0.39 | 0.23 | 0.44 | 0.19 | 287 | 6 |
| FS(1) | 0.01 | 6.47 | 0.08 | 0.90 | 0.10 | 0.03 | 0.19 | 0.07 | 326 | 5.5 |
| FS(2) | 0.01 | 6.46 | 0.12 | 0.94 | 0.07 | 0.02 | 0.18 | 0.05 | 347 | 5.5 |
| DS(1) | 0.01 | 1.98 | 0.09 | 0.40 | 0.02 | 0.01 | 0.23 | 0.05 | 205 | 5.5 |
| DS(2) | 0.01 | 1.82 | 0.06 | 0.33 | 0.01 | 0.01 | 0.17 | 0.03 | 205 | 5.5 |
| SA(4) | 0.01 | 0.01 | 0.06 | 0.03 | 0.01 | 0.01 | 0.01 | 0.01 | 25 | 5 |
| SA(6) | 0.01 | 0.02 | 0.01 | 0.01 | 0.01 | 0.24 | 0.01 | 0.01 | 21 | 5 |
| CA(4) | 0.01 | 0.05 | 0.01 | 0.06 | 0.01 | 0.07 | 0.01 | 0.01 | 16 | 5 |
| CA(6) | 0.01 | 0.01 | 0.01 | 0.04 | 0.01 | 0.08 | 0.01 | 0.01 | 30 | 6 |

From the data in Table One, it can be seen that the fixation steps of the instant process effectively reduce the susceptability to acid leaching of typical contaminating metals, taking into account minor deviations attributable to experimental error. Most dramatic reductions are, however, realized when the fixed sludge product is force dried to an appropriate level, in accordance with the most preferred embodiments of the invention. In the asphalt mixes, the amounts of leachable components are reduced to minimum values, and they are virtually indistinguishable from the commercial product in that respect.

Following calcination, the fixed sludge product will contain less than about three weight percent of water, and generally the moisture content will be below one percent. The ultimate product is a fine, granular material that is free flowing and substantially free of chunks, with a particle size distribution typified by the following, indicating the weight percentages passing through the specified mesh sizes: 96.9% through #8; 95.1% through #16; 90.6% through #30; 69.3% through #50; 44.9% through #100 and 24.4% through #200.

While the fixed sludge can be used directly (with or without calcination) as an improved landfill (because of the isolation of the metals, and the alkalinity caused by the fixation reaction), it is preferable to employ it in a product of more positive value, such as aggregate, bituminous paving mixes, roofing materials, and the like. As noted above, utilization in asphalt is especially desirable, and in that application it serves substantially the same function as the filler normally employed, for which it can be substituted in whole or in part. Because standard asphalt filler does not occur naturally and must normally be produced by grinding sand and stone, substitution of the instant filler saves the costs associated with such grinding operations. Moreover, due apparently to its metal-based composition, the present synthetic material is relatively strong and durable, and is therefore capable of enhancing the properties of the asphalt products in which it is utilized. Concerning the amount used, a controlling factor will often be the fines content of the filler, since an excessive amount of fines will tend to make the paving compound "tight", producing frost heaves under freezing conditions and slickness when it is hot. For these reasons, about 5 percent of the filler (based upon the eight of the total asphalt composition) will sometimes be regarded as a preferred upper limit, albeit that as much as 25 percent or more may beneficially be incorporated in certain instances; the usual loading will be about 5 to 15 weight percent.

Thus, it can be seen that the present invention provides a method for disposing of waste metals in a manner that is safe, effective, convenient, practical and attractive, from both economic and also environmental standpoints. The method is relatively uncomplicated, safe and convenient to carry out, and is suited for either batchwise or continuous operation. It can be utilized to convert heavy metals into products in which the metal is not only safely and permanently isolated, but which also have value on the marketplace sufficient to at least offset the cost that would be involved in disposal by other means, and which may in some instances provide a positive economic return. The invention further provides novel filler materials which are relatively stable and odorless, and unique products incorporating the same, utilizing resources that would otherwise constitute a hazardous and undesirable waste product, for which adequate means of disposal are both scarce and also expensive.

Having thus described the invention, what is claimed is:

1. In a process for producing a finely divided filler material from an aqueous waste solution containing at least one metal capable of reaction to form insoluble hydroxide and sulfide compounds, the steps comprising:
   (a) effecting reaction in said solution to produce an aqueous sludge comprised of an insoluble hydroxide and sulfide precipitate of said metal;
   (b) removing water from said sludge to produce a concentrate containing less than about 60 weight percent of water;
   (c) admixing with said concentrate about 10 to 40 percent, based upon the weight thereof, of a basic fixative, comprised at least 50 percent by weight of calcium oxide, capable of exothermic hydration and combination with said metal precpitate and effecting hydration reaction therebetween; and
   (d) drying said concentrate to produce a homogeneous, particulate filler material containing less than about 25 weight percent of water.

2. The process of claim 1 wherein a pH value of about 7.5 to 9.5 is established in said solution to produce said precipitate.

3. The process of claim 2 wherein said pH value is maintained by introducing sodium hydroxide to said solution.

4. The process of claim 2 wherein said metal is selected from the class consisting of copper, iron, nickel, chromium and mixtures inclusive of at least one thereof.

5. The process of claim 1 wherein hexavalent chrome is introduced into said solution, and wherein said chrome is reduced to the trivalent state.

6. The process of claim 5 wherein sodium bisulfite is added to said solution to effect said reduction of chrome.

7. The process of claim 1 including the step of introducing sulfide ion into said solution to produce an insoluble metal sulfide.

8. The process of claim 7 wherein said sulfide ion is introduced subsequent to producing said hydroxide precipitate therein.

9. The process of claim 7 wherein said sulfide ion is introduced as sodium sulfide.

10. The process of claim 8 wherein acis is added to said solution to reduce said pH value, to thereby promote precipitate formation.

11. The process of claim 10 wherein said pH value is reduced to less than about 5.

12. The process of claim 1 including the additional step of introducing chloride ion into said solution.

13. The process of claim 7 wherein chloride ion is introduced as calcium chloride and is added subsequent to said sulfide ion introduction step.

14. The process of claim 1 wherein said water removal step comprises settling of said precipitate, decanting of water therefrom, and filtration of the solid fraction to produce said concentrate, and wherein said concentrate contains about 40 to 50 weight percent of water prior to said drying step.

15. The process of claim 14 including the step of adding a flocculating agent to said sludge to promote coagulation and settling of suspended solid particles.

16. The process of claim 1 wherein about 25 percent by weight of said fixative is admixed with said concentrate.

17. The process of claim 1 wherein ultimate autogenic temperatures of at least about 60° Centigrade are attained during said hydration reaction, the amount of free water being reduced by evaporation as well as through hydration of said fixative.

18. The process of claim 17 wherein said ultimate autogenic temperature is at least about 100° Centigrade.

19. The process of claim 1 wherein said drying step (d) includes a substantial period of dormancy prior to said fixative admixing step (c).

20. The process of claim 19 wherein said period of dormancy is of at least about 72 hours duration.

21. The process of claim 18 wherein final phases of said drying step are effected by introducing thermal energy from an external source into the admixture of said concentrate and said fixative, thereby heating said admixture to a temperature of about 120° to 200° Centigrade and reducing said free water content of said filler material to less than about three weight percent.

22. The process of claim 1 including the additional step of initially combining a plurality of aqueous streams to produce said solution.

23. The process of claim 22 wherein at least one of said streams contains a substantial concentration of trivalent chrome, and wherein said process includes the additional step of pretreating a hexavalent chrome solution to effect reduction of said hexavalent chrome to the trivalent state, to produce said trivalent chrome stream.

24. The process of claim 23 wherein a pH value of about 2 to 5 is maintained in said hexavalent chrome solution during said pretreating step.

25. The process of claim 24 wherein sodium bisulfite is added to said hexavalent chrome solution during said pretreatment step to effect said reduction to the trivalent state.

26. The process of claim 22 wherein at least one of said streams contains a substantial concentration of converted toxic organic compounds, and wherein said process additionally includes a pretreatment step to effect the conversion therein of toxic organic compounds to non-toxic derivatives.

27. The process of claim 26 wherein said pretreatment step comprises subjecting said toxic compounds to oxidizing conditions.

28. The process of claim 22 wherein at least one of said streams contains a substantial concentration of converted harmful anions, and wherein said process additionally includes a pretreatment step to effect the conversion of harmful anions to relatively innocuous derivatives.

29. The process of claim 28 wherein said harmful anions are selected from the group consisting of cyanide and phosphate.

30. The process of claim 22 wherein at least one of said streams is derived from a mixture comprising aqueous and organic phases, and wherein said process additionally includes a pretreatment step to effect the removal of said organic phase to produce said one stream.

31. The process of claim 1 including the additional step of analyzing the metal content of the aqueous phase of said sludge to determine the nature and quantity of any additives to thereafter be introduced thereinto.

32. The process of claim 1 including the additional steps of filtering and aerating the water removed in said step (b) to produce a wastewater stream of satisfactory purity to permit direct discharge to sewerage from the system in which said process is carried out.

33. In a process for producing a finely divided filler material from an aqueous waste solution containing at least one metal capable of reaction to form insoluble hydroxide and sulfide compounds, and selected from the group consisting of copper, iron, nickel and chrome, the steps comprising:
(a) effecting reaction in said solution to produce an aqueous sludge comprised of an insoluble hydroxide and sulfide precipitate of said metal;
(b) settling said precipitate and decanting and filtering said sludge to remove water therefrom so as to produce a concentrate containing less than about 60 weight percent of water;
(c) admixing with said concentrate about 10 to 40 percent, based upon the weight thereof, of a basic fixative comprised of calcium oxide, said fixative being capable of exothermic hydration and combination with said precipitate, ultimate autogenic temperatures of at least about 60° Centigrade being attained during said hydration reaction, with the amount of free water being reduced by evaporation as well as through hydration of said fixative to thereby produce less than about 25 weight percent in said concentrate; and
(d) drying said concentrate to produce a homogeneous, particulate filler material, said drying step including a substantial period of dormancy prior to said fixative admixing step (c), and including final phases effected by introducing thermal energy from an external source into said admixture, thereby heating said admixture to a temperature of about 120° to 200° Centigrade and reducing said free water content in said filler material to less than about three weight percent.

34. The process of claim 33 wherein said reaction is effected at a pH of about 7.5 to 9.5, and wherein said process includes the additional subsequent step of introducing sulfide ion into said solution to produce an insoluble sulfide of said metal.

35. In a process for producing a finely divided filler material from an aqueous waste solution containing at least one metal capable of reaction to form insoluble hydroxide and sulfide compounds, the steps comprising:
(a) introducing sodium hydroxide and sodium sulfide into said solution to produce an aqueous sludge comprised of a precipitate of said metal;
(b) removing water from said sludge to produce a concentrate containing less than about 60 weight percent water;
(c) admixing with said concentrate about 10 to 40 percent, based upon the weight thereof, of a basic fixative comprised at least 50 percent by weight of calcium oxide, capable of exothermic hydration and combination with said metal percipitate and effecting hydration reaction there between; and
(d) drying said concentrate to produce a homogeneous, particulate filler material containing less than about 25 weight percent of water.

36. In a method for producing an asphalt paving mix, the steps comprising:
(1) producing a finely divided filler material from an aqueous waste solution containing at least one metal capable of reaction to form an insoluble hydroxide and sulfide precipitate, by a process including the substeps of:
(a) effecting reaction in said solution to produce an aqueous sludge comprised of an insoluble hydroxide and sulfide precipitate of said metal,
(b) removing water from said sludge to produce a concentrate containing less than about 60 weight percent of water,
(c) admixing with said concentrate about 10 to 40 percent, based upon the weight thereof, of a basic fixative comprised at least 50 percent by weight of calcium oxide, capable of exothermic hydration and combination with said metal precipitate and effecting hydration reaction therebetween; and
(d) drying said concentrate to produce a homogeneous, particulate filler material containing less than about 25 weight percent of water;
(2) combining said filler material with asphalt aggregate material to provide an aggregate mixture containing about 5 to 25 weight percent of said filler material; and (3) admixing hot asphalt binder with said aggregate mixture to provide said paving mix.

37. The method of claim 36 wherein said asphalt aggregate comprises sand and stone.

38. The method of claim 37 wherein said fixative comprises calcium oxide, and including the additional step of introducing sulfide ion into said solution subsequent to producing said hydroxide precipitate therein.

39. The method of claim 38 including the additional steps of initially combining a plurality of streams to produce said solution, and of analyzing the metal content of the aqueous phase of said sludge to determine the nature and quantity of any additives to thereafter be introduced thereinto.

40. The finely divided filler material made by the process of any of claims 8, 21, 25, 34 or 35.

41. The asphalt paving mix made by the method of either of claims 37 and 38.

* * * * *